W. ALEXANDER.
Churn.
No. 64,618.
Patented May 14, 1867.
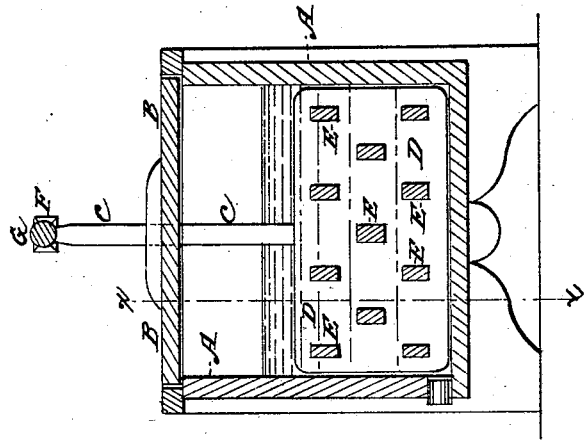
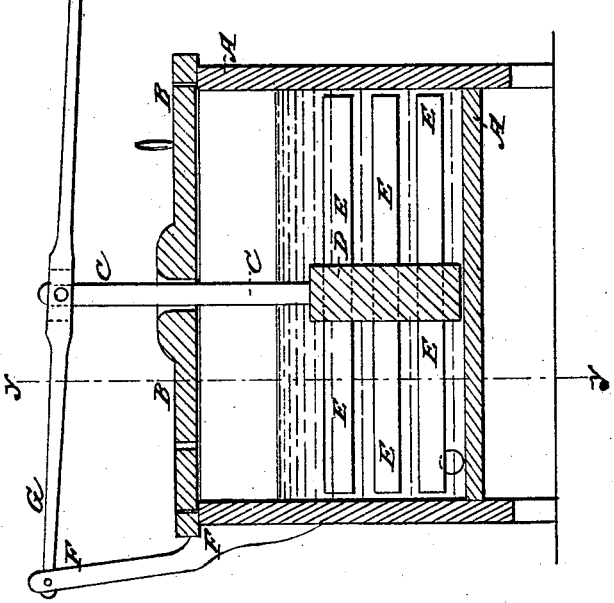
WITNESSES:
INVENTOR:

United States Patent Office.

WILLIAM ALEXANDER, OF UNION VALLEY, NEW YORK.

Letters Patent No. 64,618, dated May 14, 1867.

CHURNS.

The Schedule referred to in these Letters Patent and making part of the same.

TO ALL WHOM IT MAY CONCERN:

Be it known that I, WILLIAM ALEXANDER, of Union Valley, in the county of Cortland, and State of New York, have invented a new and useful Improvement in Churns; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved churn, taken through the line $x\ x$, fig. 2.

Figure 2 is a vertical cross-section of the same, taken through the line $y\ y$, fig. 1.

Similar letters of reference indicate like parts.

My invention has for its object to furnish an improved churn, simple in construction, not liable to get out of order, and which will churn the cream quicker and more evenly than the churns now in use; and it consists in the construction of the dasher, and in operating the dasher by means of a lever pivoted to a support attached to the side of the churn body; the whole being constructed and arranged as hereinafter more fully described.

A is the body of the churn, which is a rectangular box of a size proportioned to the amount of churning required to be done. B is the lid or cover of the churn, fitting closely upon its top or mouth, and provided with one or more handles for convenience in putting it on and taking it off, and with one or more air-holes for admitting air to the churn. Through the centre of the lid B is formed a hole for the passage of the dasher handle C. To the lower end of the dasher handle is attached a block, D, of such a length as to reach across the body A of the churn, as shown in fig. 2, and move up and down freely within it. Through the block D are passed bars E of such a length as to reach longitudinally across the churn body and move freely up and down within it, as shown in fig. 1. The bars are placed horizontally, and in such a manner that they may alternate with each other, as shown in fig. 2, so that the currents formed in the cream by the passage of each forward bar may be intercepted and broken up by the following bars, thus thoroughly intermingling the cream and throwing it into violent agitation, bringing the butter in a very short time. F is a support, attached to the side of the box or body A, to the upper end of which is pivoted the end of the lever G, to the middle part of which is pivoted the upper end of the dasher handle C, so that by raising and lowering the free end of the said lever G the dasher D E may be easily operated.

I claim as new, and desire to secure by Letters Patent—

The dasher D E, constructed substantially in the manner herein shown and described, and for the purpose set forth.

WILLIAM ALEXANDER.

Witnesses:
WILLIAM H. PERRY,
BENTON B. JONES.